(12) United States Patent
Schmitz et al.

(10) Patent No.: US 8,899,594 B2
(45) Date of Patent: Dec. 2, 2014

(54) ADJUSTABLE SEAL APPARATUS FOR MOUNTING A MIXING APPARATUS TO A VESSEL

(71) Applicant: McNish Corporation, Aurora, IL (US)

(72) Inventors: Daniel J. Schmitz, Bristol, IL (US); Arn W. Johnson, Batavia, IL (US); Richard L. Dornfeld, Aurora, IL (US)

(73) Assignee: McNish Corporation, Aurora, IL (US)

( * ) Notice: Subject to any disclaimer, the term of this patent is extended or adjusted under 35 U.S.C. 154(b) by 228 days.

(21) Appl. No.: 13/724,472

(22) Filed: Dec. 21, 2012

(65) Prior Publication Data

US 2014/0175751 A1  Jun. 26, 2014

(51) Int. Cl.
| | |
|---|---|
| *F16J 15/40* | (2006.01) |
| *F16J 15/14* | (2006.01) |
| *B01F 15/00* | (2006.01) |

(52) U.S. Cl.
CPC ......... *F16J 15/14* (2013.01); *F16J 15/40* (2013.01); *B01F 15/00006* (2013.01); *B01F 15/00662* (2013.01)
USPC .......................................... 277/431; 277/432

(58) Field of Classification Search
USPC ................... 277/423, 427, 431, 432
See application file for complete search history.

(56) References Cited

U.S. PATENT DOCUMENTS

| | | | |
|---|---|---|---|
| 2,764,943 A | 10/1956 | Peters | |
| 4,383,768 A | 5/1983 | Kupka | |
| 4,753,534 A | 6/1988 | Markle | |
| 5,044,762 A | 9/1991 | Blakley et al. | |
| 5,346,361 A | 9/1994 | Jurgill et al. | |
| 5,855,472 A * | 1/1999 | Ravitts | 417/421 |
| 6,095,207 A * | 8/2000 | Enders | 141/348 |
| 6,467,773 B1 * | 10/2002 | Rinaldo | 277/409 |
| 6,834,860 B2 * | 12/2004 | Rinaldo | 277/418 |
| 7,771,543 B2 * | 8/2010 | Bang | 134/57 D |
| 2003/0030223 A1 * | 2/2003 | Rinaldo | 277/412 |
| 2004/0046323 A1 * | 3/2004 | McCutchan | 277/409 |

OTHER PUBLICATIONS

Stamo Maskin AB, Propelleromrorare drawing 2-42762, May 21, 2008.
Stamo Maskin AB, Propeller Agitatoer drawing 2-46727, Nov. 23, 2011.
Stamo Maskin AB, Propeller Agitator drawing 2-45083, Aug. 26, 2010.
Flygt, Flygt Top-Entry Agitator brochure, pp. 1-8, Oct. 19, 2011.
Stamo Maskin AB, Water and Wastewater Treatment brochure, pp. 1-8, Oct. 2010.
Flygt 4860/4870 for Easy-To-Service Digester Mixing Advertisement.

* cited by examiner

*Primary Examiner* — Gilbert Lee
(74) *Attorney, Agent, or Firm* — Barnes & Thornburg LLP

(57) ABSTRACT

An adjustable seal apparatus for mounting a mixing apparatus having a movable shaft in sealed engagement with a wall of a vessel and in a selected orientation with respect to the wall of the vessel. The adjustable seal apparatus includes a seal mechanism for creating a gas-tight seal between the shaft of the mixing apparatus and the wall of the vessel and an adjustable mounting mechanism for selectively positioning the shaft in a desired orientation.

18 Claims, 13 Drawing Sheets

ADJUSTABLE SEAL APPARATUS FOR MOUNTING A MIXING APPARATUS TO A VESSEL

BACKGROUND

The present disclosure is directed to an adjustable seal apparatus for mounting a mixing apparatus or other devices having a movable shaft in sealed engagement with a wall of a vessel, and in particular to an adjustable seal apparatus for adjustably mounting the mixing apparatus to the vessel in a selected orientation with respect to the vessel while maintaining a seal between the mixing apparatus and the vessel. The adjustable seal apparatus includes a seal mechanism for creating a gas-tight liquid seal between the mixing apparatus and the wall of the vessel, and an adjustable mounting mechanism for mounting the mixing apparatus to the wall of the vessel in desired orientation with respect to the wall of the vessel while the seal mechanism maintains the gas-tight liquid seal between the mixing apparatus and the wall of the vessel.

BRIEF DESCRIPTION OF THE DRAWING FIGURES

DETAILED DESCRIPTION

Figure 1:
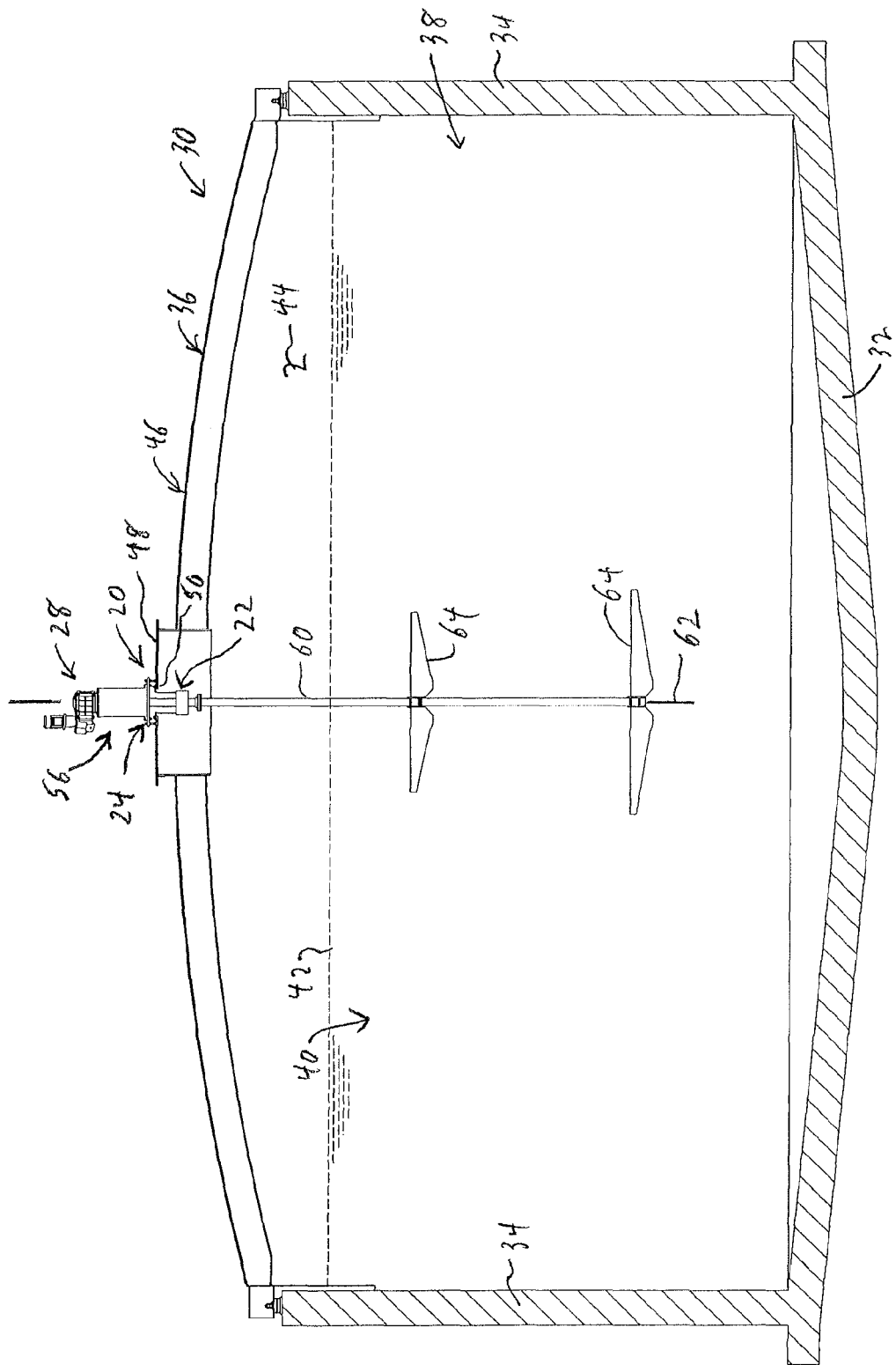
FIG. 1 is a side elevational view of the adjustable seal apparatus of the present disclosure shown mounting a mixing apparatus to the top wall of a vessel with the vessel shown cross-section.
Figure 2:
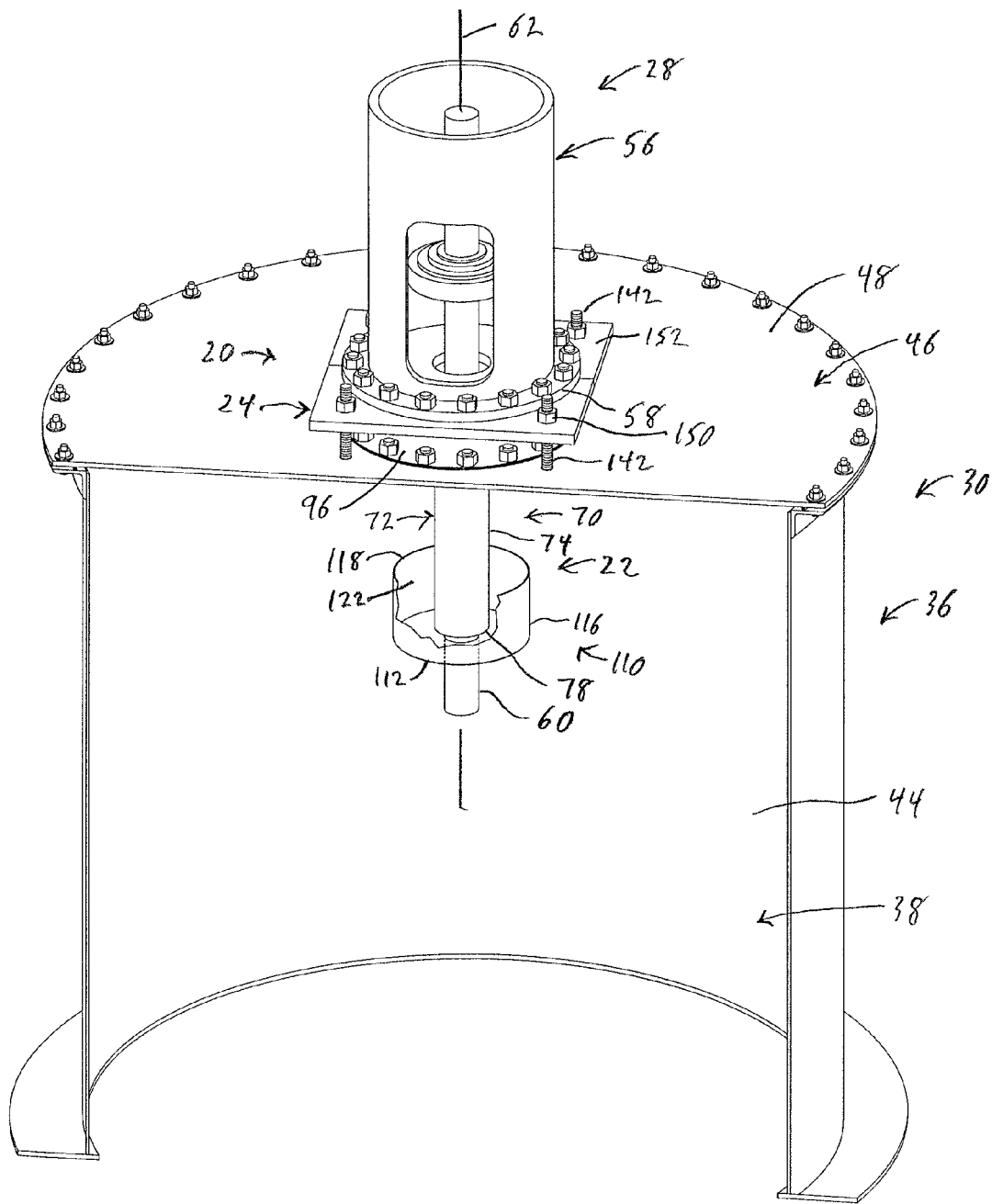
FIG. 2 is a partial perspective view showing the adjustable seal apparatus of the present disclosure mounting a mixing apparatus to the top wall of a vessel.

The present disclosure relates to an adjustable seal apparatus for mounting a mixing apparatus or other devices having a movable shaft in sealed engagement with a wall of a vessel and in a selected orientation with respect to the wall of the vessel. An embodiment of the adjustable seal apparatus is shown in FIGS. 1-6 as adjustable seal apparatus 20. Adjustable seal apparatus 20 includes a seal mechanism 22 and an adjustable mounting mechanism 24 for mounting a mixing apparatus 28 to a vessel 30. Vessel 30 includes a bottom wall 32, a peripheral side wall 34 extending upwardly from bottom wall 32, a cover 36 in gas-tight sealing engagement with side wall 34 and an interior chamber 38. Cover 36 may be fixedly attached to side wall 34 or may be in floating sealed engagement with side wall 34. Cover 36 includes a top wall 46. Wall 46 may include a generally planar wall portion 48 that may be selectively removable from the remaining portion of wall 46. Vessel 30 may be, for example, a digester as used in connection with water and waste-water treatment.

As shown in FIG. 1, vessel 30 is adapted to contain a liquid 40 for example, water, sludge or a slurry, in chamber 38 having a liquid surface 42. Chamber 38 includes a gas chamber 44 located between liquid surface 42 and cover 36 that contains one or more gases, such as, for example, methane. Cover 36 is adapted to retain the gas in gas chamber 44 within vessel 30 and prevent the gas within gas chamber 44 from escaping from chamber 38 of vessel 30 into the atmosphere on the exterior of vessel 30. Wall 46 of cover 36 includes an opening 50 formed by a rim 52 that provides fluid communication between gas chamber 44 and the atmosphere on the exterior of vessel 30 prior to installation of seal apparatus 20 and mixing apparatus 28.

Mixing apparatus 28 includes a drive mechanism 56 having a base 58 and a movable shaft 60. Shaft 60 includes a linear central axis 62, a first end operatively coupled to drive mechanism 56 and a second end disposed within liquid 40 contained in chamber 38 of vessel 30. Shaft 60 extends through opening 50 in wall 46 of vessel 30 and through an opening in base 58 of drive mechanism 56 such that shaft 60 is suspended from drive mechanism 56. One or more mixing vanes 64 are attached to shaft 60 for conjoint movement therewith. Mixing vanes 64 are located within liquid 40 in chamber 38. Drive mechanism 56 is adapted to selectively rotate shaft 60 and mixing vanes 64 about central axis 62 to thereby mix liquid 40. Alternatively, drive mechanism 56 may move shaft 60 and mixing vanes 64 in a linear translational direction back and forth along central axis 62 in a generally upwardly and downwardly direction, or in a combination of both rotational movement and linear translational movement. Alternatively, mixing apparatus 28 may comprise an agitator or other mechanism having a moveable shaft. A sensor, camera or other device may be attached to shaft 60 within chamber 38 or chamber 44 of vessel 30, in place of or in addition to mixing vanes 64, to monitor or otherwise assess the condition of the interior of vessel 30 and/or its contents, or to perform a desired function on vessel 30 or its contents.

Seal mechanism 22 of seal apparatus 20 includes a male seal member 70. Male seal member 70 includes a pipe 72 having an annular peripheral side wall 74 that extends between a first end 76 and a second end 78. Side wall 74 extends generally concentrically about and along a linear central axis 80. Side wall 74 may be generally circular, or in such other configuration as desired, in cross-section. First end 76 of side wall 74 includes an aperture 82 formed by a rim 84 of side wall 74. Second end 78 of side wall 74 includes an aperture 86 formed by a rim 88 of side wall 74. Side wall 74 includes a bore 90 that extends from first end 76 to second end 78 and that is in fluid communication with apertures 82 and 86.

Figure 3:
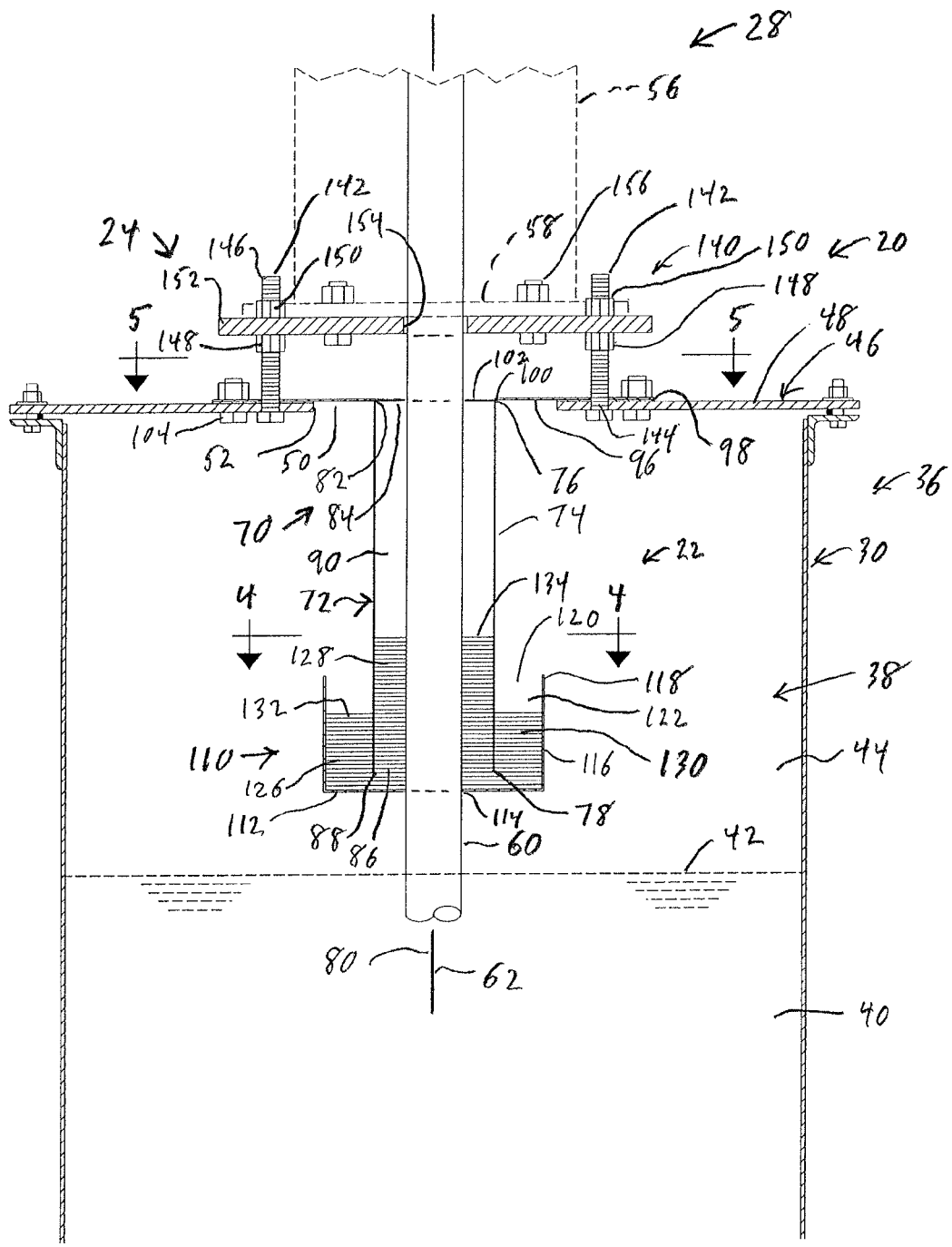
FIG. 3 is a cross sectional view of the adjustable seal apparatus shown mounting a mixing apparatus to the top wall of a vessel and showing the shaft of the mixing apparatus extending through the adjustable seal apparatus with a gas-tight liquid seal shown between the male seal member and a female seal member of the adjustable seal apparatus.
Figure 4:
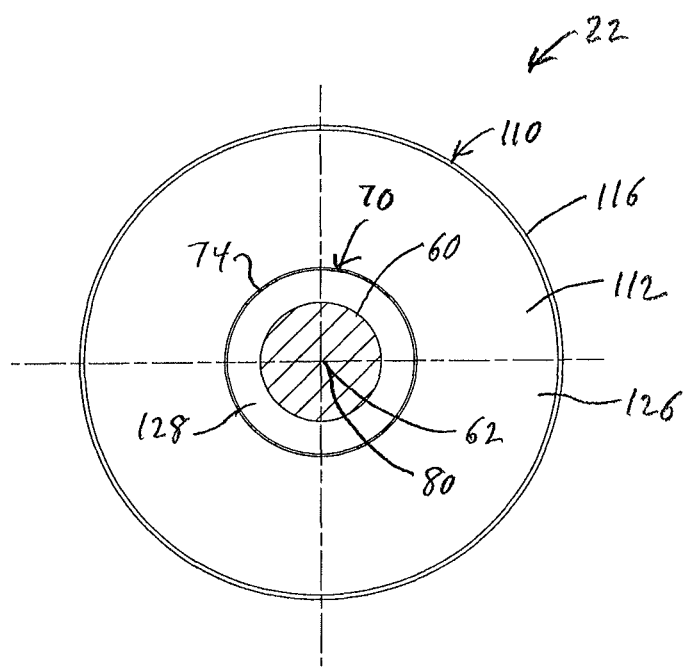
FIG. 4 is a cross-sectional view taken along line 4-4 of FIG. 3.

Male seal member 70 also includes a generally annular plate-like flange 96. Flange 96 includes a peripheral outer rim 98 and a peripheral inner rim 100 that forms an aperture 102. First end 76 of side wall 74 of pipe 72 is connected to flange 96 such that aperture 82 and bore 90 of side wall 74 are in fluid communication with aperture 102 of flange 96. Side wall 74 of pipe 72 extends generally perpendicular to flange 96. Outer rim 98 of flange 96 is spaced outwardly from and extends peripherally around first end 76 of side wall 74. Flange 96 of male seal member 70 is adapted to be coupled in sealing engagement with a top surface of wall 46 of vessel 30 by fasteners 104 such that a gas-tight seal is created between flange 96 and wall 46. Male seal member 70 is stationarily coupled to wall 46. An elastomeric gasket or other sealing material may be located between flange 96 and wall 46 to facilitate the creation of a gas-tight seal therebetween if desired. Side wall 74 extends from flange 96 through aperture 50 in wall 46 and into gas chamber 44 within vessel 30. As shown in FIG. 3, wall portion 48 of wall 46 is generally level or horizontal, flange 96 is generally parallel to wall portion 48 of wall 46, and central axis 80 of side wall 74 is generally coaxial with central axis 62 of shaft 60 such that side wall 74 and shaft 60 are generally plumb or vertical. Second end 78 of side wall 74 is located above and spaced apart from liquid surface 42.

Seal mechanism 22 also includes a female seal member 110. Female seal member 110 comprises a seal drum having a generally planar annular end wall 112 having a central aperture 114 and a peripheral side wall 116. Peripheral side wall 116 extends around the perimeter of end wall 112 and extends upwardly from end wall 112 to a peripheral rim 118 that forms an aperture 120. As shown in FIG. 3, shaft 60 extends through aperture 114 of end wall 112 with end wall 112 being generally perpendicular to central axis 62 of shaft 60. End wall 112 is coupled in sealing engagement to shaft 60, such as by welding or the like, to create a gas and water-tight seal therebetween and such that female seal member 110 is conjointly movable with shaft 60 rotatably about central axis 62 and/or translationally along central axis 62. Female seal member 110 is coupled to shaft 60 and spaced apart from and above liquid surface 42 and within gas chamber 44 of vessel 30. As shown in FIG. 3, side wall 116 of female seal member 110 extends upwardly from end wall 112 toward flange 96 of male seal member 70. Side wall 74 of male seal member 70 extends into chamber 122 of female seal member 110 such that second end 78 of side wall 74 is located within chamber 122 and below rim 118 of side wall 116 of female seal member 110 and spaced apart from and above end wall 112 of female seal member 110.

Male seal member 70 and female seal member 110 are located with respect to one another to form an outer annular chamber 126 between side wall 116 of female seal member 110 and an interior surface of side wall 74 of male seal member 70, and an inner annular chamber 128 formed between shaft 60 of mixing apparatus 28 and an interior surface of side wall 74 of male seal member 70. Outer annular chamber 126 is in fluid communication with inner annular chamber 128 through a gap between second end 78 of side wall 74 of male seal member 70 and end wall 112 of female seal member 110. As shown in FIG. 3, bore 90 and aperture 82 of side wall 74 and inner annular chamber 128 are in fluid communication with the atmosphere outside of vessel 30 and outer annular chamber 126 is in fluid communication with gas chamber 44 of vessel 30 through aperture 120 of female seal member 110.

A sealing liquid 130, such as for example water, is located within outer annular chamber 126 and inner annular chamber 128 such that sealing liquid 130 in outer annular chamber 126 has a liquid surface 132 and sealing liquid 130 within inner annular chamber 128 has a liquid surface 134. Sealing liquid 130 creates a gas-tight liquid seal between male seal member 70 and female seal member 110 and thereby between the atmosphere on the exterior of vessel 30 and gas chamber 44 within the interior of vessel 30. The gas-tight seal created by sealing liquid 130 is maintained while shaft 60 and female seal member 110 are moved with respect to male seal member 70 and vessel 30 rotationally about central axis 62 of shaft 60 and/or translationally along central axis 62 of shaft 60. The difference in elevation of liquid surface 132 with respect to liquid surface 134 is indicative of the difference in pressure between the gas in gas chamber 44 and the pressure of the air in the atmosphere outside of vessel 30. The difference in the elevations of liquid surfaces 132 and 134 are also dependent upon the density of the liquid used as the sealing liquid. The depth of the sealing liquid 130 accommodates movement of shaft 60 and female seal member 110 with respect to male seal member 70 and the pressure differential between gas in gas chamber 44 and the atmosphere outside of vessel 30 while maintaining a gas-tight seal.

Figure 5:
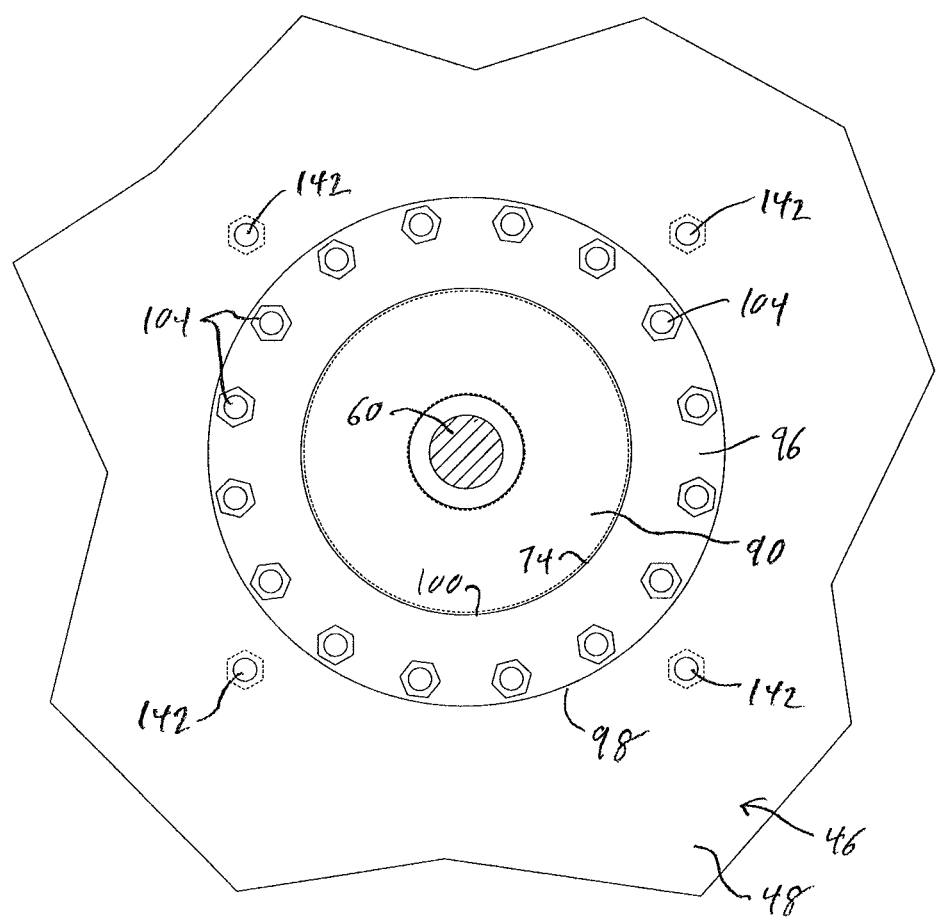
FIG. 5 is a cross-sectional view taken along line 5-5 of FIG. 3.

Mounting mechanism 24 of seal apparatus 20 includes one or more adjustable mounting apparatus 140. Each mounting apparatus 140 includes a threaded support post 142. Threaded support post 142 may comprise a threaded fastener such as a bolt having a threaded shaft and a head at one end of the shaft. As shown in FIGS. 3 and 5, mounting mechanism 24 includes four support posts 142, although fewer or additional support posts may be used if desired. Each support post 142 extends generally linearly between a bottom end 144 and a top end 146. Bottom end 144 of each support post 142 is coupled to wall portion 48 of wall 46 such that support post 142 extends outwardly from wall 46 externally of chamber 38. Bottom ends 144 of support posts 142 may be welded to wall 46 or may be coupled to wall 46 between a head attached to bottom end 144 of support posts 142 and a nut threadably coupled to support post 142 such that wall 46 is clamped between the head and the nut. Support posts 142 and generally parallel to one another and to central axis 80 of male seal member 70 and are generally perpendicular to wall 46 of vessel 30.

Each mounting apparatus 140 also includes an adjustably positionable support member 148 coupled to support post 142. Support member 148 may comprise a threaded member such as a threaded nut threadably coupled to support post 142. Support member 148 is selectively positionable along the length of support post 142 between bottom end 144 and top end 146 such that the top surface of support member 148 may be positioned at a desired elevation and distance from wall 46 of vessel 30. Each mounting apparatus 140 also includes a locking member 150 coupled to support post 142. Each locking member 150 may comprise a threaded member such as a threaded nut threadably coupled to support post 142.

Mounting mechanism 24 also includes a mounting plate 152. Mounting plate 152 includes one or more outer apertures with each aperture adapted to receive a respective support post 142. Mounting plate 152 also includes a central aperture 154 through which shaft 60 of mixing apparatus 28 extends. Mounting plate 152 is coupled to base 58 of mixing apparatus 28 by a plurality of fasteners 156, such as threaded bolts and nuts. Mounting plate 152 is supported on the top surfaces of support members 148 and is coupled in engagement with the top surfaces of support members 148 and to support posts 142 by locking members 150. Locking members 150 are tightened against the top surface of mounting plate 152 to thereby clamp mounting plate 152 between support members 148 and locking members 150.

Support members 148 are selectively positioned to a desired elevation such that the top surfaces of the support members 148 are located in a generally level horizontal plane. Support members 148 thereby support mounting plate 152 in a generally level horizontal plane and thereby support mixing apparatus 28 a generally level orientation such that central axis 62 of shaft 60 of mixing apparatus 28 is in a generally plumb or vertical orientation. If desired, mounting plate 152 can be split into a plurality of portions such that the portions can be placed around shaft 60 of mixing apparatus 28 without the need to insert shaft 60 through central aperture 154 of mounting plate 152. Alternatively, support members 148 may directly support base 58 of mixing apparatus 28 without the use of a mounting plate 152 such that support posts 142 extend through apertures in base 58 and locking members 150 engage base 58 to secure base 58 to support members 148.

Optimally, wall portion 48 of wall 46 of vessel 30 is located in a level horizontal orientation such that mixing apparatus can be mounted to wall portion 48 of wall 46 with base 58 of mixing apparatus 28 parallel to wall portion 48 and central axis 62 of shaft 60 in a plumb orientation. However, in practice wall portion 48 of wall 46 is often out of level such that wall portion 48 is located at an inclined angle with respect to a horizontal plane. The angle of inclination of wall portion 48 can vary from one vessel 30 to another vessel 30. If base 58 of mixing apparatus 28 is mounted parallel to an inclined wall portion 48 of wall 46, central axis 62 of shaft 60 will be out of plumb or at an angle to vertical, such that mixing apparatus 28 may be subjected to increased vibration, wobbling and stress, which are all detrimental to the operation of the mixing apparatus 28. Central axis 80 of male seal member 70 will also be out of plumb.

Figure 6:
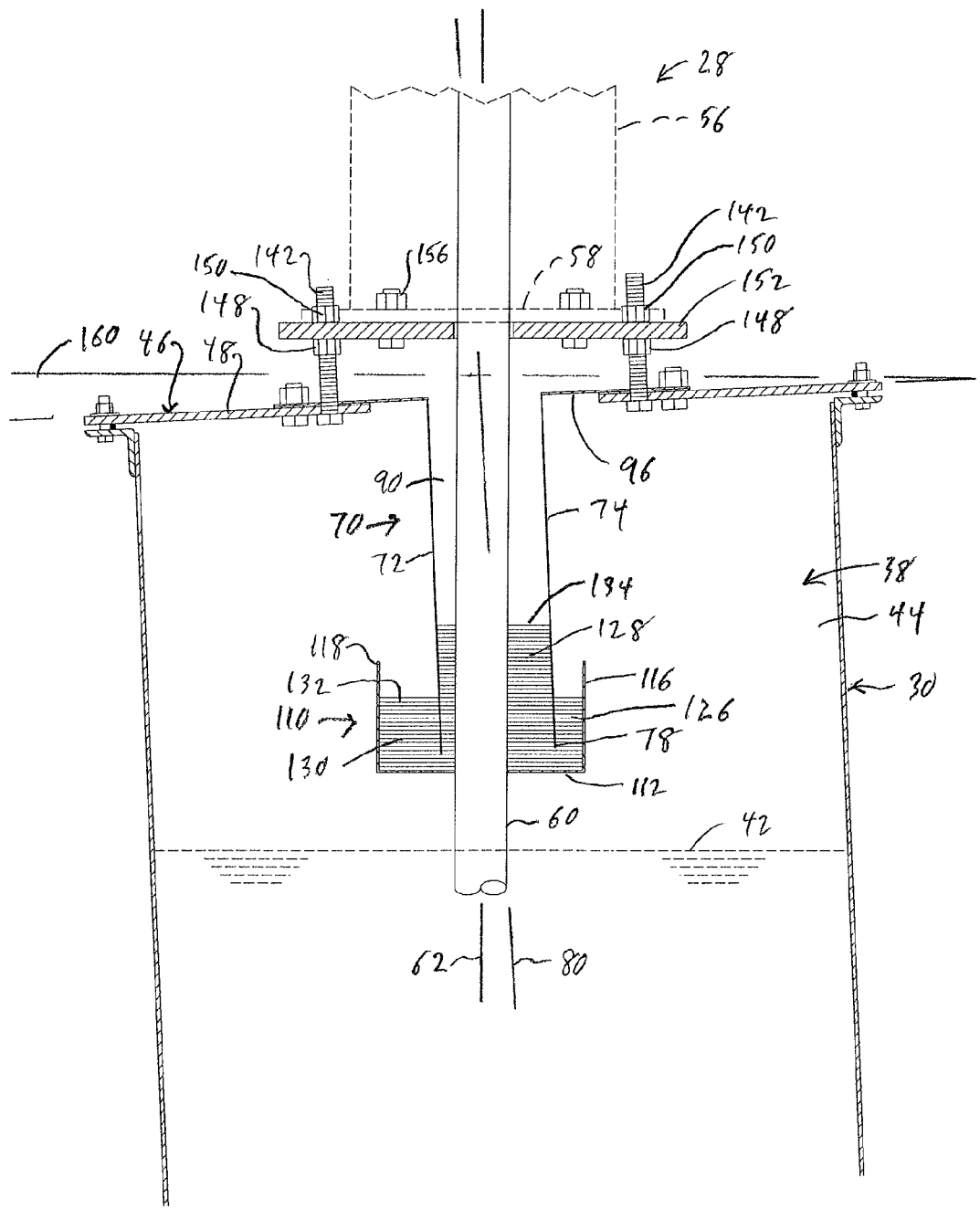
FIG. 6 is a cross-sectional view showing the adjustable seal apparatus mounting a mixing apparatus to the top wall of a vessel wherein the top wall of the vessel is out of level and the adjustable seal apparatus mounts the mixing apparatus to the top wall with the shaft of a mixing apparatus in a plumb orientation.

As shown in FIG. 6, when wall portion 48 of wall 46 is inclined with respect to a horizontal plane 160 and is not horizontal or level and central axis 80 of male seal member 70 is located at an angle to vertical and is out of plumb, support member 148 of each mounting apparatus 140 can be selectively positioned with respect to wall portion 48 of wall 46 such that each support member 148 is located in a generally horizontal plane, such that support members 148 support mounting plate 152 in a generally horizontal position. Mounting plate 152 correspondingly supports base 58 of mixing apparatus 28 in a level orientation such that shaft 60 of mixing apparatus 28 is plumb and vertical. Central axis 62 of shaft 60 is thereby disposed at an angle to central axis 80 of male seal member 70. Female seal member 110 is thereby also disposed at an angle to male seal member 70.

Although shaft 60 and female seal member 110 are disposed at an angle to male seal member 70, male seal member 70 and female seal member 110 maintain a gas-tight liquid rotary and/or translational seal therebetween to prevent gas in gas chamber 44 from escaping from chamber 38 of vessel 30 into the atmosphere. Central axis 80 of male seal member 70 may be out of alignment with central axis 62 of shaft 60 by up to approximately fifteen degrees or more while a seal is maintained between male seal member 70 and female seal member 110. Adjustable seal apparatus 20 thereby provides a gas-tight seal between shaft 60 of mixing apparatus 28 and wall 46 of vessel 30, while also providing selective positioning of mixing apparatus 28 with respect to wall portion 48 of wall 46 of vessel 30 such that central axis 62 of shaft 60 can be placed in a plumb orientation regardless of whether wall portion 48 of wall 46 of vessel 30 is level or out of level.

Figure 7:
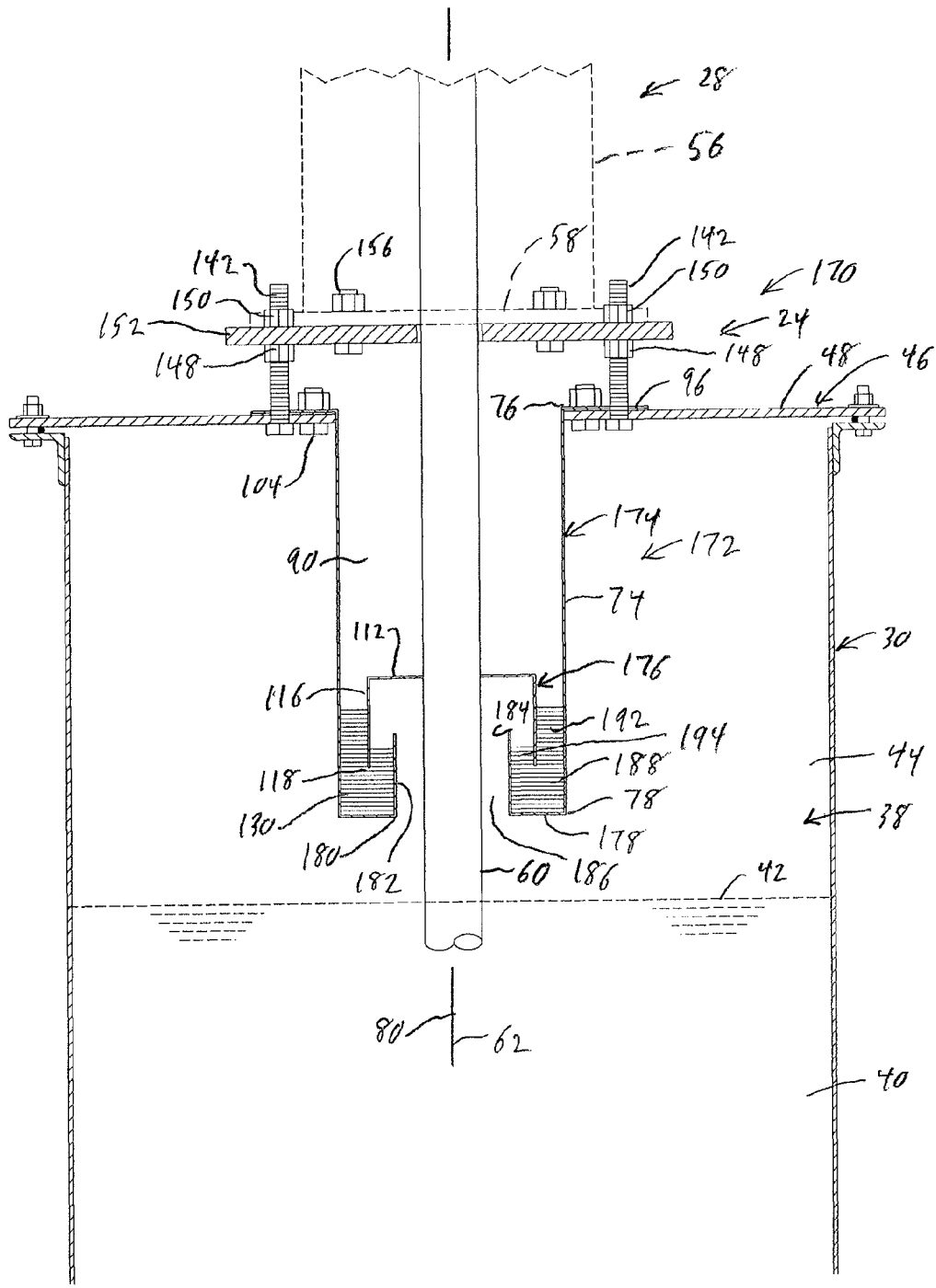
FIG. 7 is a cross-sectional view of another embodiment of the adjustable seal apparatus of the present disclosure shown mounting a mixing apparatus in sealed engagement with a top wall of a vessel.

FIG. 7 shows an alternate embodiment of the adjustable seal apparatus identified with the reference number 170. Parts that are common to both adjustable seal apparatus 170 and adjustable seal apparatus 20 are identified with the same reference numbers. Adjustable seal apparatus 170 includes a mounting mechanism 24 for mounting a mixing apparatus 28 to a vessel 30 as does adjustable seal apparatus 20. Adjustable seal apparatus 170 includes a seal mechanism 172 having a male seal member 174 and a female seal member 176. Male seal member 174 includes a pipe having a side wall 74 and a flange 96 as does male seal member 70. Male seal member 174 additionally includes an annular end wall 178 attached to and extending inwardly from second end 78 of side wall 74. End wall 178 includes an inner peripheral rim 180. Male seal member 174 also includes a generally annular inner side wall 182. Inner side wall 182 extends generally concentrically about central axis 80 of side wall 74 from rim 180 of end wall 178 to a peripheral rim 184. Rim 184 forms an aperture that is in fluid communication with a bore 186 formed within inner side wall 182. An annular chamber 188 is formed between side wall 174 and inner side wall 182.

Female seal member 176 includes an end wall 112 having a central aperture through which shaft 60 extends. End wall 112 is adapted to be sealingly attached to shaft 60 and annular side wall 116 extends around shaft 60 and outwardly from end wall 112. As shown in FIG. 7, female seal member 176 is located within bore 90 of side wall 74, and side wall 116 of female seal member 176 extends downwardly from end wall 112 into annular chamber 188 of male seal member 174. Side wall 116 of female seal member 176 thereby forms an outer annular chamber 192 between side wall 116 and side wall 74 of male seal member 174 and an inner annular chamber 194 located between side wall 116 of female seal member 176 and inner side wall 182 of male seal member 174.

Sealing liquid 130 is located within annular chamber 188, outer annular chamber 192 and inner annular chamber 194 to create a gas-tight liquid seal between male seal member 174 and female seal member 176 and thereby between shaft 60 of mixing apparatus 28 and wall 46 of vessel 30. Shaft 60 and female seal member 176 are conjointly rotatable about and/or translatable along central axis 62 of shaft 60 with respect to male seal member 174. Mounting mechanism 24 of adjustable seal apparatus 170 can selectively orientate mixing apparatus 28 and shaft 60 with respect to male seal member 174 and wall 46 of vessel 30 such that shaft 60 is in a generally plumb position while maintaining a gas-tight seal between male seal member 174 and female seal member 176.

Figure 8:
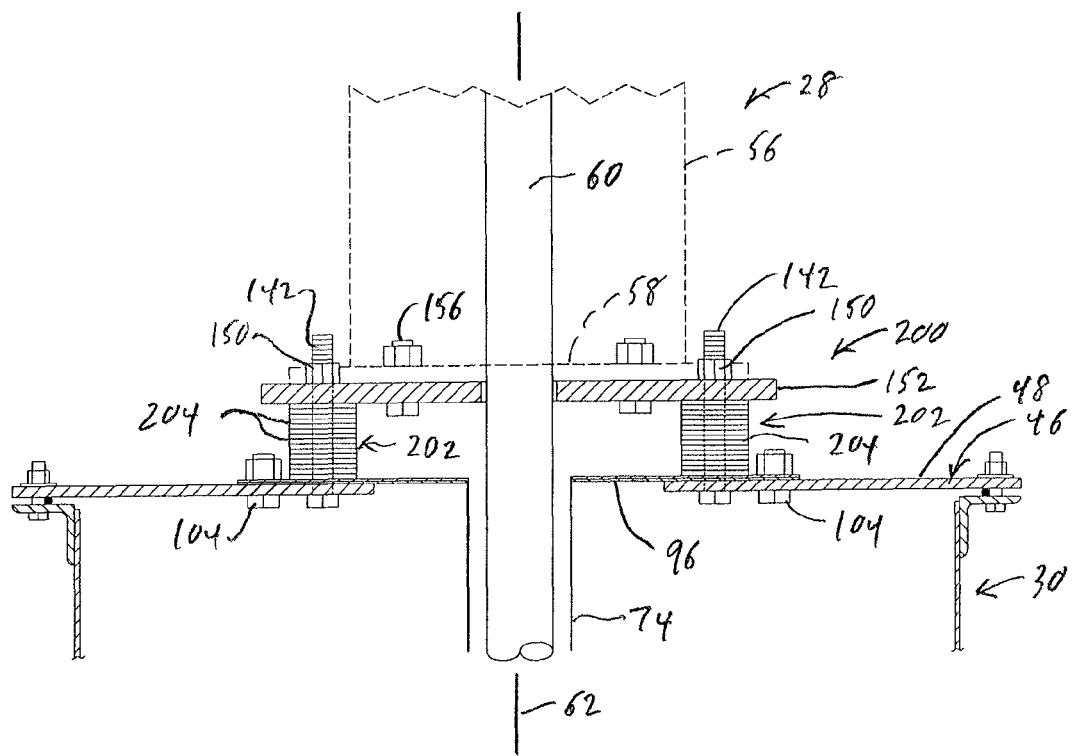
FIG. 8 is a cross-sectional view of a further embodiment of the adjustable seal apparatus of the present disclosure wherein the adjustable mounting mechanism includes one or more adjustable shim stacks.

FIG. 8 shows an alternate embodiment of a mounting mechanism identified with reference number 200 that can be used in connection with either seal mechanism 22 or seal mechanism 172. Mounting mechanism 200 includes one or more support posts 142, a locking member 150 associated with each support post 142 and a mounting plate 152 adapted to be coupled to base 58 of mixing apparatus 28. Mounting mechanism 200 also includes a support member 202 associated with each support post 142. Each support member 202 is adapted to support mounting plate 152 and mixing apparatus 28 on wall 46 of vessel 30. Each support member 202 is selectively adjustable in height such that the top surface of each support member 202 may be located at a desired elevation and desired distance from wall 46 of vessel 30.

Support member 202 may comprise a shim stack having one or more shims 204 located between wall 46 of vessel 30 and mounting plate 152. Each shim 204 may include an aperture through which support post 142 extends. The aperture in each shim 204 may be generally circular or may be open ended such that the shim 204 may be slid horizontally around post 142. A combination of shims 204 having generally circular apertures and shims 204 having open ended apertures may be used. The number of shims 204 included in each shim stack of support member 202 may be varied as desired to place the top surface of support member 202 at a desired elevation. The shims 204 in each support member 202 may be of various different thicknesses.

Locking members 150 threadably engage each post 142 and clamp shims 204 between mounting plate 152 and wall 46 of vessel 30. The height of each support member 202 can be varied as desired by selectively adding or removing shims 204 of desired thicknesses. The height of each support member 202 may thereby be selectively adjusted to place shaft 60 of mixing apparatus 28 in a generally plumb orientation, while seal mechanism 22 or 172 maintains a seal between shaft 60 and wall 46 of vessel 30.

Figure 9:
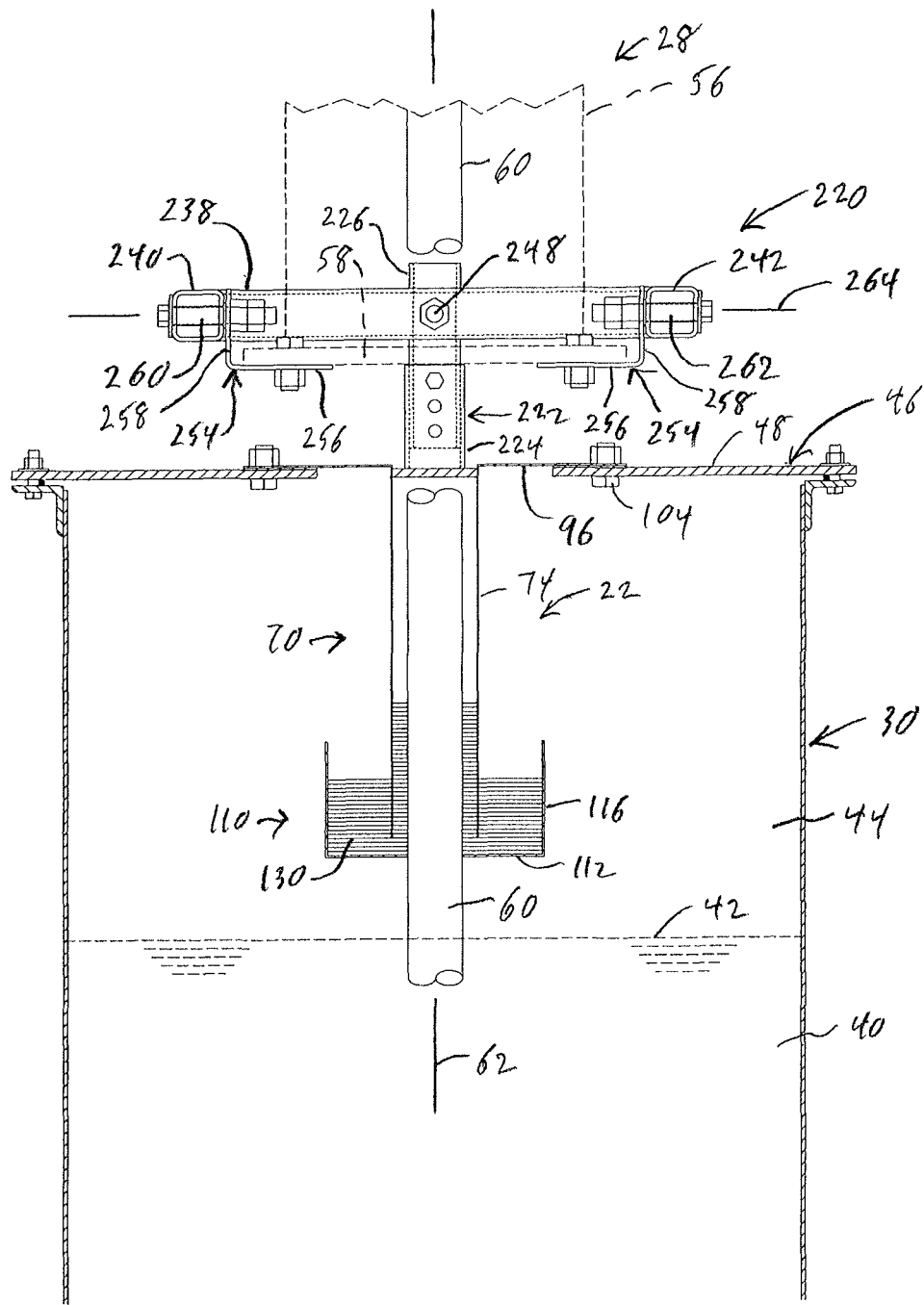
FIG. 9 is a further embodiment of the adjustable seal apparatus wherein the adjustable mounting mechanism includes a pivotably mounted leveling frame for self-leveling of the mixing apparatus and placing the shaft of the mixing apparatus in a plumb orientation.
Figure 10:
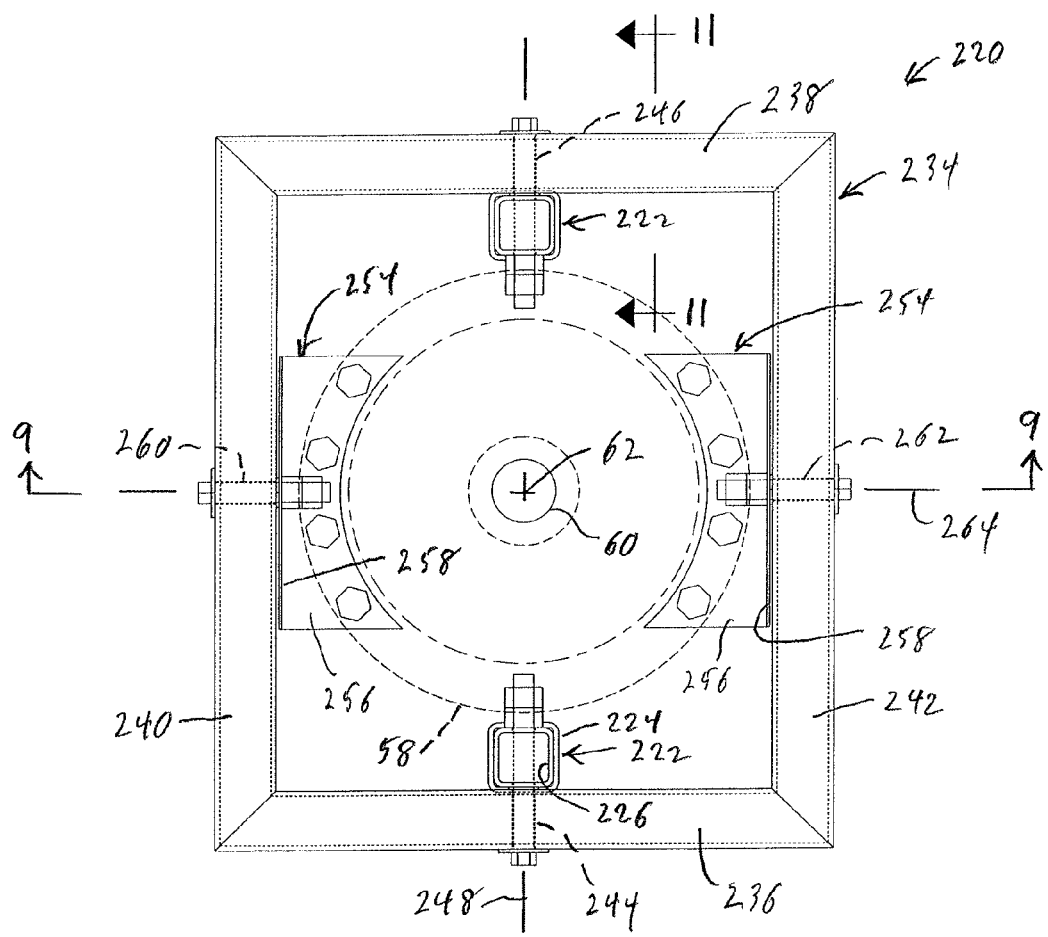
FIG. 10 is a top view of the adjustable seal apparatus of FIG. 9.
Figure 11:
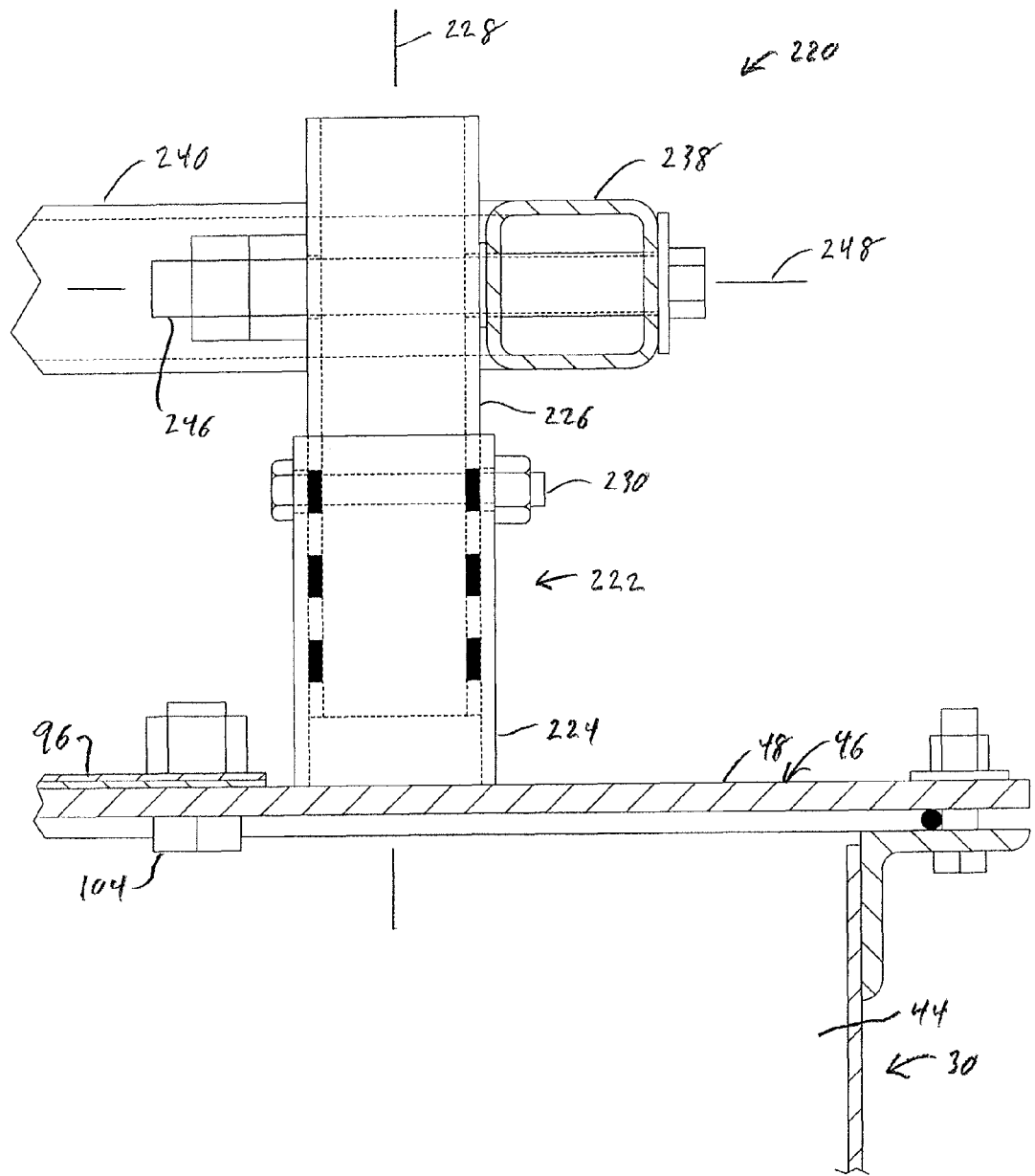
FIG. 11 is a cross-sectional view taken along line 11-11 of FIG. 10.

FIGS. 9-11 show an alternate embodiment of a mounting mechanism that can be used with either seal mechanism 22 or seal mechanism 172 and that is identified with reference number 220. Mounting mechanism 220 includes first and second spaced apart support posts 222 adapted to be coupled to wall 46 of vessel 30. Each support post 222 includes an outer sleeve 224 and an inner sleeve 226 located within outer sleeve 224. Outer sleeve 224 and inner sleeve 226 are selectively movable with respect to one another along a central axis 228 of support post 222 such that the height or length of support post 222 can be selectively adjusted as desired. Inner sleeve 226 includes a plurality of apertures that are linearly aligned with one another along axis 228, such that a selected aperture of inner sleeve 226 can be aligned with an aperture in outer sleeve 224 to receive a fastener 230 such as a threaded bolt and nut. Fastener 230 retains inner sleeve 226 in a selected position with respect to outer sleeve 224.

Mounting mechanism 220 also includes a leveling frame 234. Leveling frame 234 is generally rectangular and includes a generally linear first leg 236 and a spaced apart and generally parallel linear second leg 238. Leveling frame 234 also includes a generally linear third leg 240 and a spaced apart and generally parallel linear fourth leg 242. Third leg 240 and fourth leg 242 extend between respective ends of first leg 236 and second leg 238. First leg 236 is pivotably coupled to first support post 222 by a pivot shaft 244. Second leg 238 of leveling frame 234 is pivotably coupled to second support post 222 by a pivot shaft 246. Pivot shaft 244 and pivot shaft 246 are coaxially aligned with one another along a first pivot axis 248. Pivot shaft 244 is coupled to first leg 236 at a midpoint of first leg 236 and pivot shaft 246 is coupled to second leg 238 at a midpoint of second leg 238. Pivot shafts 244 and 246 pivotably couple leveling frame 234 to support posts 222 such that leveling frame 234 is pivotal with respect to support posts 222 about first pivot axis 248.

Mounting mechanism 220 also includes one or more mounting members 254. A first mounting member 254 includes a first leg 256 adapted to be coupled to base 58 of mixing apparatus 28 by one or more fasteners and a second leg 258 that is adapted to be pivotably coupled to third leg 240 of leveling frame 234 by a pivot shaft 260. A second mounting member 254 includes a first leg 256 adapted to be coupled to base 58 of mixing apparatus 28 and a second leg 258 pivotably coupled to fourth leg 242 of leveling frame 234 by a pivot shaft 262. Mounting members 254 are pivotably coupled respectively to third leg 240 and fourth leg 242 at the midpoint of third and fourth legs 240 and 242. Pivot shafts 260 and 262 are coaxially aligned with one another along a second pivot axis 264. Second pivot axis 264 is generally perpendicular to first pivot axis 248. First pivot axis 248 and second pivot axis 264 approximately intersect central axis 62 of shaft 60. First leg 256 of each mounting member 254 is generally planar and horizontal and each second leg 258 extends upwardly from an end of first leg 256 generally perpendicular to first leg 256. If desired, respective first legs 256 of mounting members 254 can be connected to one another. Mixing apparatus 28 and mounting members 254 are pivotable with respect to leveling frame 234 about second pivot axis 264.

Mixing apparatus 28 and shaft 60 are pivotable about both first pivot axis 248 and second pivot axis 264 such that leveling frame 234 and mounting members 254 will orient central axis 62 of shaft 60 in a generally plumb orientation automatically in response to gravitational pull on mixing apparatus 28. Mounting mechanism 220 will selectively position central axis 62 of shaft 60 in a generally plumb orientation while seal mechanism 22 or 172 maintains a gas-tight seal between shaft 60 and wall 46 of vessel 30.

Figure 12:
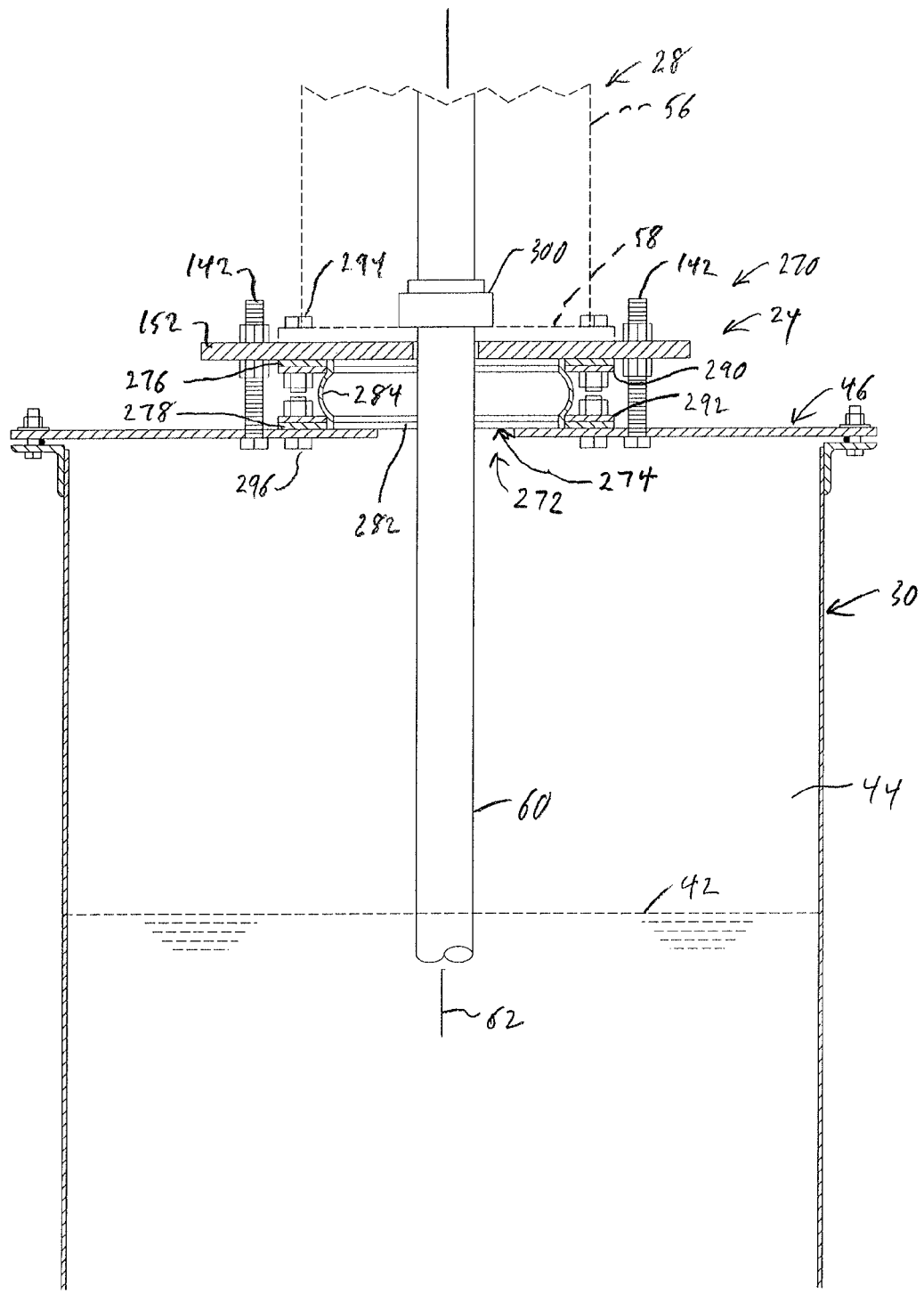
FIG. 12 is a cross-sectional view of another embodiment of the adjustable seal apparatus shown mounting a mixing apparatus in sealed engagement with a top wall of a vessel.
Figure 13:
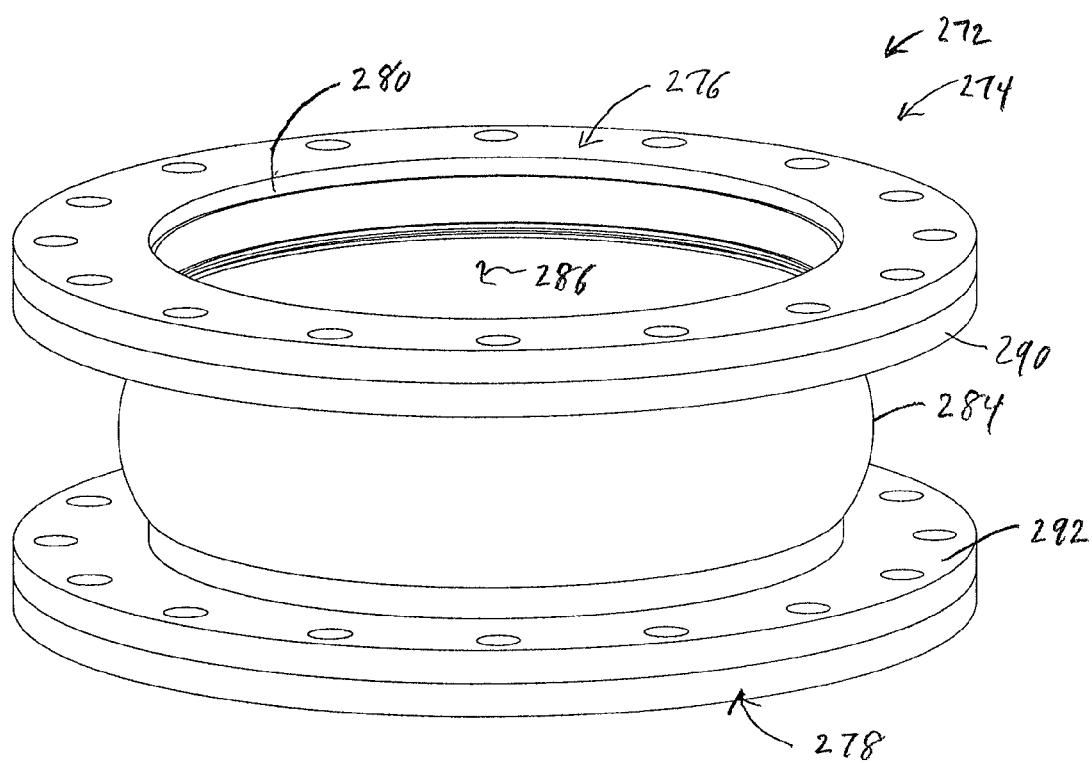
FIG. 13 is a perspective view of the seal member of the adjustable seal apparatus of FIG. 12.

FIGS. 12 and 13 show another embodiment of an adjustable seal apparatus identified with reference number 270. Adjustable seal apparatus 270 may be used in connection with mounting mechanism 24 or 200. Adjustable seal apparatus 270 as shown in FIG. 12 includes a mounting mechanism 24 that is constructed as described in connection with adjustable seal apparatus 20. Adjustable seal apparatus 270 also includes a seal mechanism 272 having a seal member 274. Seal member 274 includes a generally annular first flange 276 and a spaced apart generally annular second flange 278. First flange 276 includes a central aperture 280 and second flange 278 includes a central aperture 282. Each flange 276 and 278 includes a plurality of apertures arranged in a bolt circle. Seal member 274 also includes a flexible generally annular side wall 284 extending between first flange 276 and second flange 278. Side wall 284 may be concavely curved. Seal member 274 includes a bore 286 that extends within side wall 284 and that is in communication with apertures 280 and 282 of first and second flanges 276 and 278. Side wall 284 and flanges 276 and 278 are formed from a resiliently flexible material, such as for example an elastomeric material, such as urethane or rubber, or a flexible metal.

Seal mechanism 272 also includes generally annular first clamping member 290 having a plurality of apertures arranged in a bolt circle. First clamping member 290 extends around side wall 284 of seal member 274 and is adapted to be coupled to mounting plate 152 with a plurality of fasteners 294 to thereby clamp first flange 276 into sealing engagement with mounting plate 152. A second clamping member 292 having a plurality of apertures arranged in a bolt circle extends around side wall 284 and is adapted to be coupled to wall 46 of vessel 30 by a plurality of fasteners 296 such that second clamping member 292 clamps second flange 278 of seal member 274 into sealing engagement with wall 46 of vessel 30. Seal member 274 thereby forms a flexible gas-tight seal between wall 46 of vessel 30 and mounting plate 152.

Mounting plate 152 is coupled in sealed engagement, such as by the use of a gasket or the like, with base 58 of mixing apparatus 28. A mechanical seal 300 is provided between shaft 60 and base 58 of mixing apparatus 28. A gas-tight seal is thereby formed between gas chamber 44 of vessel 30 and the atmosphere on the exterior vessel 30.

Seal mechanism 272 allows mounting mechanism 24 to adjustably position shaft 60 in a desired orientation with respect to wall 46 of vessel 30, such as in a plumb orientation, while seal member 272 maintains a gas-tight seal between wall 46 of vessel 30 and mounting plate 152.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. An adjustable seal apparatus for mounting a drive mechanism having a movable shaft in sealed engagement with a wall of a vessel and in a selected orientation with respect to the wall of the vessel, said adjustable seal apparatus comprising:
a male seal member including a pipe and a flange, said pipe including a peripheral side wall having a first end, a second end and a hollow bore, said flange including an outer peripheral rim and an aperture formed by an inner peripheral rim, said first end of said side wall of said pipe attached to said flange such that said aperture of said flange is in fluid communication with said bore of said side wall of said pipe, said flange adapted to be coupled in sealing engagement with the wall of the vessel with the shaft of the drive mechanism extending through said bore of said side wall of said pipe from an exterior of the vessel to an interior chamber of the vessel;
a female seal member including an end wall having an aperture and a peripheral side wall attached to and extending outwardly from said end wall, the shaft of the drive mechanism adapted to extend through said aperture in said end wall and to be coupled in sealing engagement with said end wall, said side wall of said female seal member including a first end coupled to said end wall and a second end including a peripheral rim forming an aperture, said end wall and said side wall of said female seal member forming a chamber, said aperture of said side wall of said female seal member being in fluid communication with the chamber of the vessel, said second end of said side wall of said male seal member adapted to be located within said chamber of said female seal member such that said chamber of said female seal member is in fluid communication with said bore of said side wall of said male seal member, said chamber of said female seal member and said bore of said side wall of said male seal member adapted to receive a sealing liquid such that said sealing liquid forms a gas-tight seal between said aperture of said flange of said male seal member and said aperture of said side wall of said female seal member and thereby between the exterior of the vessel and the interior chamber of the vessel while allowing the shaft and female seal member to conjointly move with respect to said male seal member; and
one or more adjustable mounting apparatus for mounting the drive mechanism to the wall of the vessel, each said mounting apparatus having an adjustably positionable support member adapted to support the drive mechanism in a desired orientation, whereby the orientation of the drive mechanism can be selectively adjusted with respect to the wall of the vessel to place the shaft of the drive mechanism in a desired orientation while maintaining the gas-tight seal between said female seal member and said male seal member.

2. The adjustable seal apparatus of claim 1 wherein said male seal member includes an end wall attached to said second end of side wall of said pipe and that extends inwardly from said second end of said side wall of said pipe, said end wall of said male seal member including an aperture adapted to receive the shaft of the drive mechanism, and an annular inner side wall having a bore adapted to receive the shaft of the drive mechanism, said inner side wall having a first end attached to said end wall of said male seal member and a second end having a peripheral rim forming an aperture in fluid communication with the interior chamber of the vessel, said peripheral rim of said second end of said inner side wall of said male seal member adapted to be located within said chamber of said female seal member.

3. The adjustable seal apparatus of claim 1 wherein said female seal member is conjointly rotatable with the shaft of the drive mechanism about a central axis of the shaft.

4. The adjustable seal apparatus of claim 1 wherein said female seal member is conjointly translatable with the shaft of the drive mechanism along a central axis of the shaft.

5. The adjustable seal apparatus of claim 1 wherein each said mounting apparatus comprises a threaded post, said support member of said mounting apparatus being threadably coupled to said post, said support member being selectively positionable along said post to a desired position with respect to the wall of the vessel.

6. The adjustable seal apparatus of claim 5 wherein said support member of each said mounting apparatus comprises a threaded nut threadably coupled to said threaded post, said nut adapted to support the drive mechanism.

7. The adjustable seal apparatus of claim 1 wherein each said mounting apparatus includes a locking member, said locking member adapted to couple the drive mechanism in engagement with said support member of said mounting apparatus.

8. The adjustable seal apparatus of claim 7 wherein each said mounting apparatus comprises a threaded post and said locking member comprises a threaded nut threadably coupled to said post.

9. The adjustable seal apparatus of claim 1 including a mounting plate adapted to be mounted to the drive mechanism, said one or more mounting apparatus adapted to mount said mounting plate to the wall of the vessel at a desired orientation with respect to the wall of the vessel to thereby place the shaft of the drive mechanism in a desired orientation with respect to the wall of the vessel.

10. The adjustable seal apparatus of claim 1 wherein each said mounting apparatus comprises a post and said support member comprises a shim stack, said shim stack including one or more shims, whereby the height of each shim stack can be varied as desired to locate the shaft of the drive mechanism in a desired orientation.

11. The adjustable seal apparatus of claim 10 wherein each said mounting apparatus includes a locking member coupled to said post, said locking member adapted to secure the drive mechanism in engagement with said shim pack of said mounting apparatus.

12. The mounting apparatus of claim 10 wherein each said shim of said shim pack includes an aperture, said post of said mounting apparatus extending through said aperture of each said shim in said shim pack.

13. An adjustable seal apparatus for mounting a drive mechanism having a movable shaft in sealed engagement with a wall of a vessel and in a selected orientation with respect to the wall of the vessel, said adjustable seal apparatus comprising:
a male seal member including a pipe and a flange, said pipe including a peripheral side wall having a first end, a second end and a hollow bore, said flange including an outer peripheral rim and an aperture formed by an inner peripheral rim, said first end of said side wall of said pipe attached to said flange such that said aperture of said flange is in fluid communication with said bore of said side wall of said pipe, said flange adapted to be coupled in sealing engagement with the wall of the vessel with the shaft of the drive mechanism extending through said bore of said side wall of said pipe from an exterior of the vessel to an interior chamber of the vessel;

a female seal member including an end wall having an aperture and a peripheral side wall attached to and extending outwardly from said end wall, the shaft of the drive mechanism adapted to extend through said aperture in said end wall and to be coupled in sealing engagement with said end wall, said side wall of said female seal member including a first end coupled to said end wall and a second end including a peripheral rim forming an aperture, said end wall and said side wall of said female seal member forming a chamber, said aperture of said side wall of said female seal member being in fluid communication with the chamber of the vessel, said second end of said side wall of said male seal member adapted to be located within said chamber of said female seal member such that said chamber of said female seal member is in fluid communication with said bore of said side wall of said male seal member, said chamber of said female seal member and said bore of said side wall of said male seal member adapted to receive a sealing liquid such that said sealing liquid forms a gas-tight seal between said aperture of said flange of said male seal member and said aperture of said side wall of said female seal member and thereby between the exterior of the vessel and the interior chamber of the vessel while allowing the shaft and female seal member to conjointly move with respect to said male seal member; and a mounting apparatus adapted to mount the drive mechanism to the wall of the vessel such that the shaft of the drive mechanism is generally plumb, said mounting apparatus including one or more support posts adapted to be coupled to the wall of the vessel, a leveling frame pivotably coupled to said one or more support posts for pivotal movement about a first pivot axis with respect to said one or more support posts, and one or more mounting members adapted to be coupled to the drive mechanism, said one or more mounting members pivotably coupled to said leveling frame for pivotal movement about a second pivot axis with respect to said leveling frame, whereby said leveling frame and said one or more mounting members are adapted to position the shaft of the drive mechanism in a generally plumb orientation.

14. The adjustable seal apparatus of claim 13 wherein each said support post of said mounting apparatus comprises an outer sleeve and an inner sleeve, said inner sleeve and said outer sleeve being selectively movable with respect to one another along a central axis of said support post, and a fastener for selectively retaining said inner sleeve in position with respect to said outer sleeve.

15. The adjustable seal apparatus of claim 13 wherein said mounting apparatus includes one or more first pivot shafts, each said first pivot shaft pivotably connecting said leveling frame to a respective support post, said one or more first pivot shafts being coaxially aligned along said first pivot axis.

16. The adjustable seal apparatus of claim 15 wherein said mounting apparatus includes one or more second pivot shafts, each said second pivot shaft being coupled to said leveling frame and to one of said one or more mounting members, said one or more second pivot shafts being coaxially aligned along said second pivot axis.

17. The adjustable seal apparatus of claim 13 wherein said leveling frame includes a first leg and a spaced apart second leg, and a third leg and a spaced apart fourth leg, said third leg and said fourth leg extending between said first leg and second leg, a first support post being pivotably coupled to a midpoint of said first leg and a second support post being pivotably coupled to a midpoint of said second leg, said one or more mounting members being pivotably coupled respectively to midpoints of said third leg and said fourth leg of said leveling frame.

18. The adjustable seal apparatus of claim 13 wherein each said one or more mounting members comprises a first leg adapted to be coupled to the drive mechanism and a second leg pivotably coupled to said leveling frame.

* * * * *